United States Patent [19]

Gaylord

[11] 4,110,874
[45] Sep. 5, 1978

[54] RETRACTABLE PIN DISCONNECT

[75] Inventor: John A. Gaylord, San Diego, Calif.

[73] Assignee: H. Koch & Sons, Inc., a division of Global Systems, a Gulf & Western Company, Anaheim, Calif.

[21] Appl. No.: 843,577

[22] Filed: Oct. 19, 1977

[51] Int. Cl.² ............................................. A44B 11/25
[52] U.S. Cl. ............................. 24/230 AS; 24/211 R; 24/201 A; 24/230 R; 244/151 A
[58] Field of Search ......... 24/230 AS, 73 PH, 201 A; 244/151 A

[56] References Cited

U.S. PATENT DOCUMENTS

| 3,712,173 | 1/1973 | Savioli | 24/230 AS |
| 3,744,102 | 7/1973 | Gaylord | 244/151 A |

*Primary Examiner*—Bernard A. Gelak
*Attorney, Agent, or Firm*—George B. White

[57] ABSTRACT

This retractable pin disconnect is shown herein in connection with the male connector member of existing hardware for parachute harness and the like. The retractable pins engage opposite sockets in the legs of the male connector member for webbing. The retractable pins are on the opposite sidewalls of a hollow body and are connected to a pair of bell cranks which latter are connected to a yoke embracing the arms of the bell cranks so as to rock the bell cranks by pulling the yoke toward the other end of the body thereby to pull the retractable pins inwardly of the body and out of the sockets of the legs of the male connector member. The body is adapted to a webbing and thus interposed between the webbing and the connector member and functions in place of the usual webbing pin of the connector member. Means are provided for pulling the yoke for actuating the bell cranks and resilient means urge the yoke so as to move and hold the bell cranks in position for extending the retractable pins.

7 Claims, 6 Drawing Figures

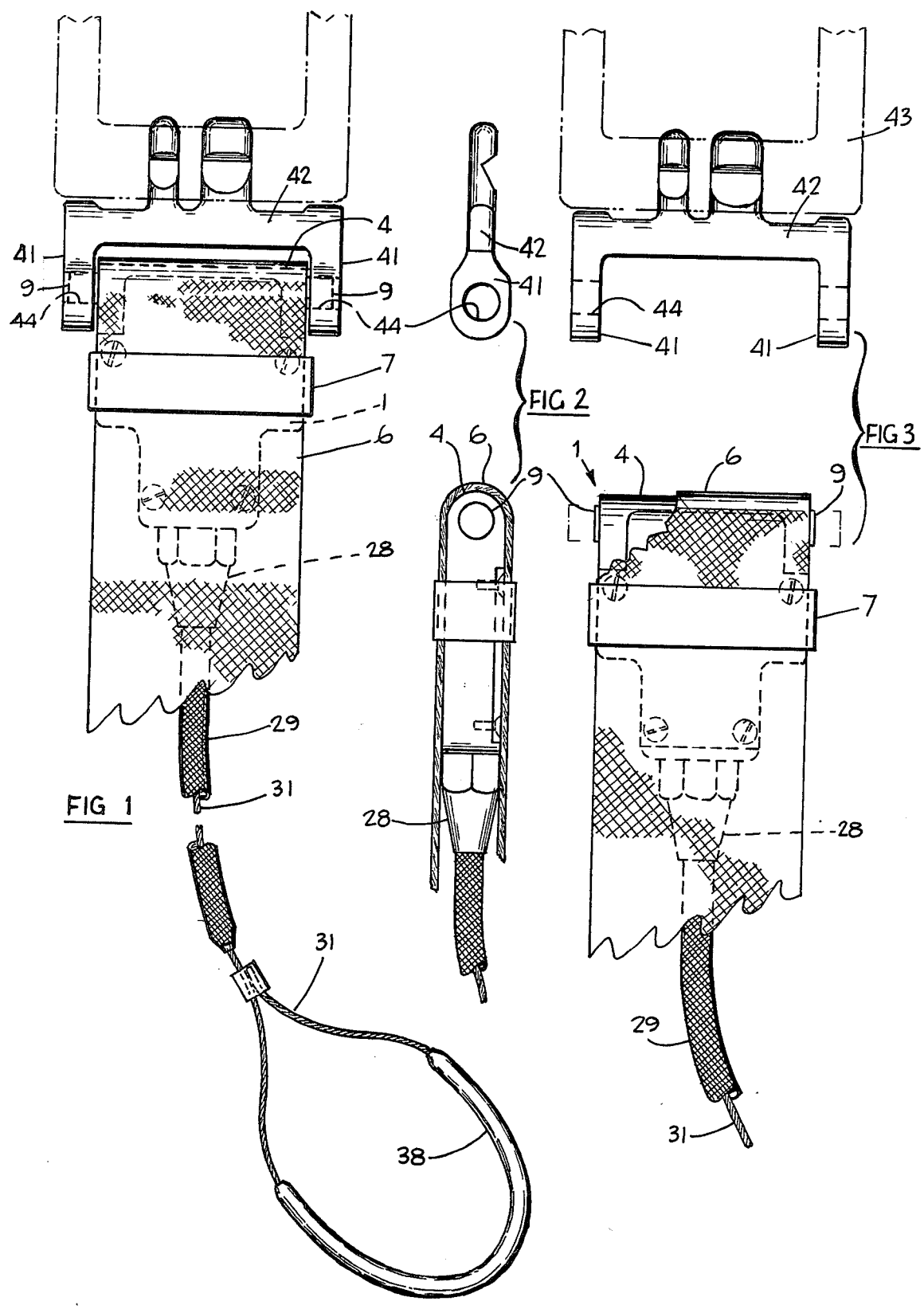

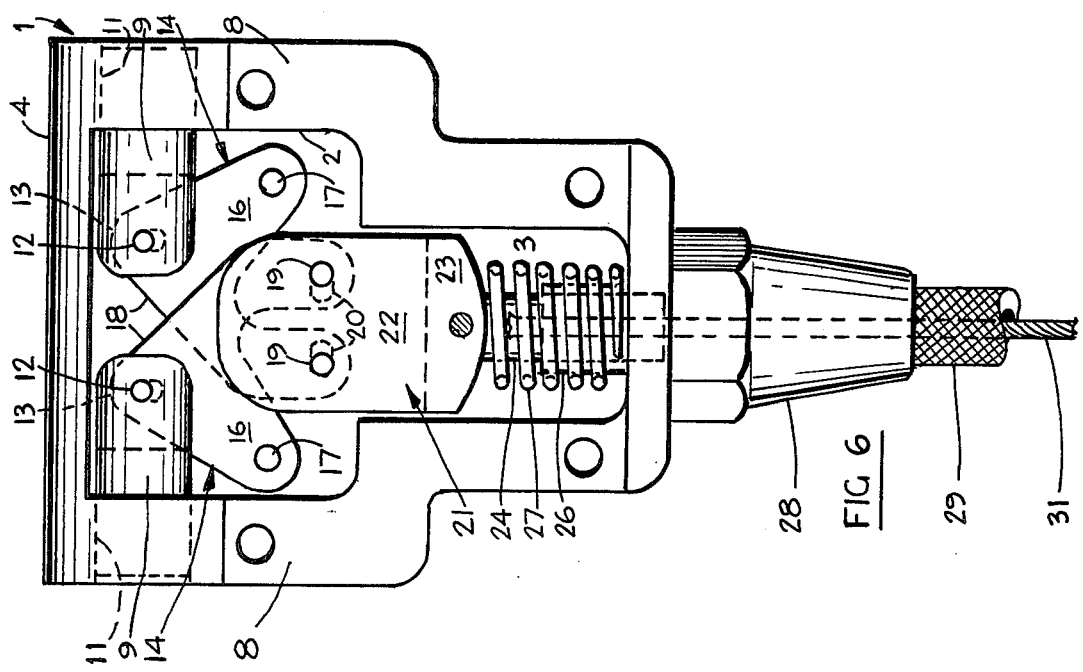
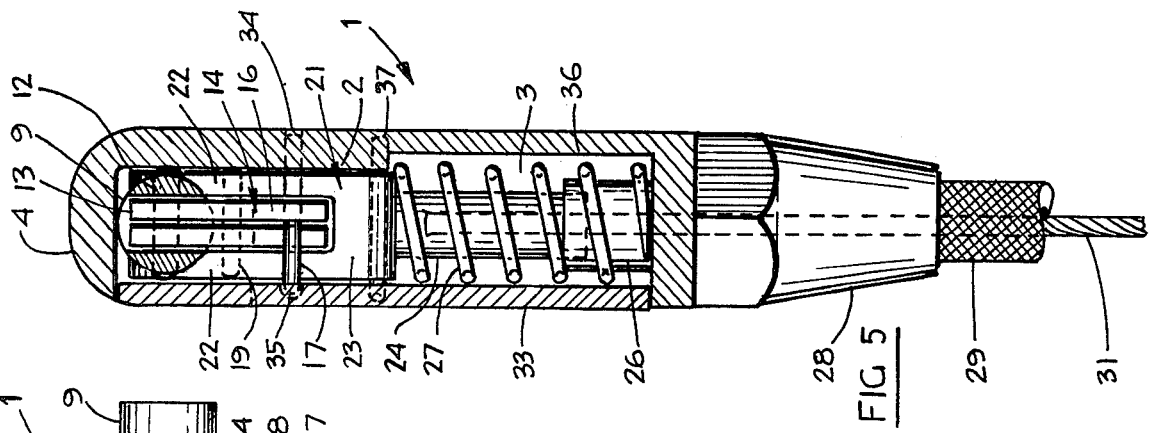
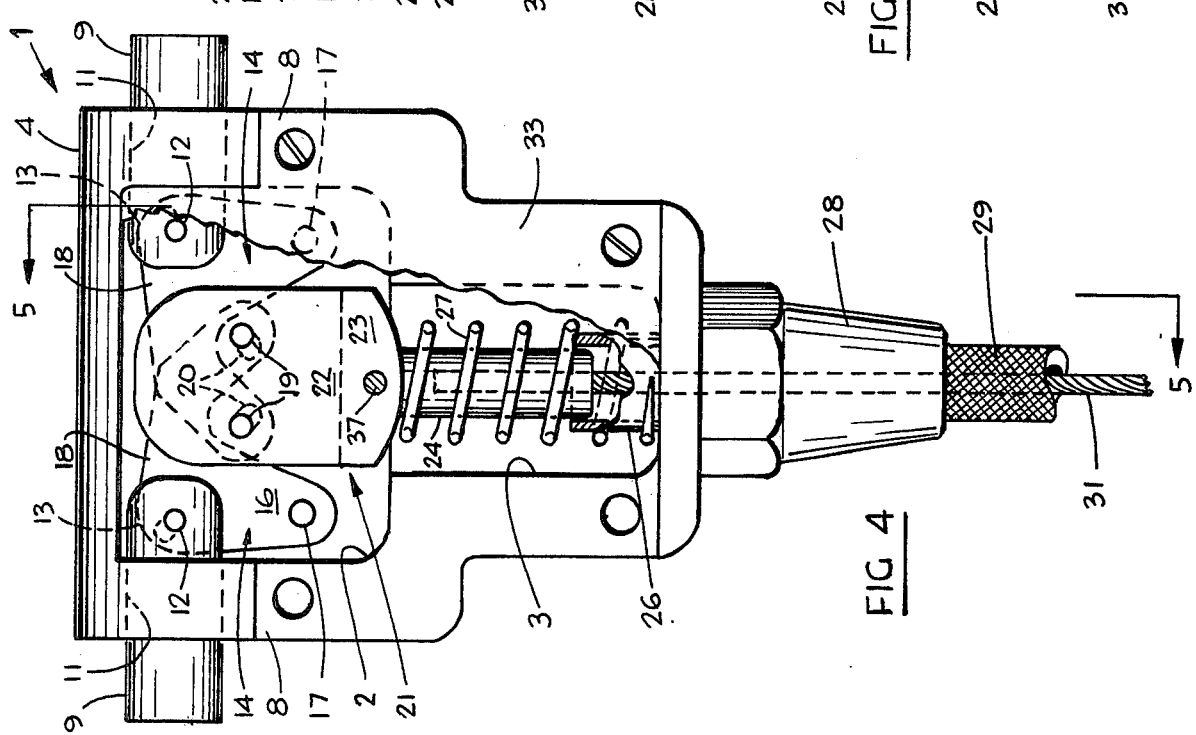

RETRACTABLE PIN DISCONNECT

BACKGROUND OF THE INVENTION

There were several retractable pin connections provided for webbing connection in the past, the closest of which applicant is aware are previous U.S. Pat. Nos. 3,744,102; 3,785,597; 3,845,525; each of which accomplished its respective objects and purposes; however, each required bulky and more complex mechanism and changes in the existing webbing connectors.

The primary object of the invention is to provide a retractable pin disconnect device which is very small in size and light in weight, yet it will hold a large load; and wherein all parts are completely closed in and so covered they will not be affected by salt spray, sand, dust or fungus; which can be quickly actuated for disconnect when, for any reason, the male disconnect member is not or cannot be separated from the female connector member of web connectors; and which can be used with most known hardware on parachute harness in use at the present time; and which can be installed without requiring any change of present manual or automatic operation of existing web connectors and disconnect devices.

BRIEF DESCRIPTION OF THE DRAWINGS

FIG. 1 shows the retractable pin disconnect assembled in a webbing.

FIG. 2 is a side view of the disconnect released.

FIG. 3 shows the retractable pin disconnect released.

FIG. 4 is a front view of the retractable pin disconnect with the front plate partially removed.

FIG. 5 is a sectional view taken substantially on lines 5—5 of FIG. 4 but with the cover plate in position, and FIG. 6 is a view of the disconnect with the cover plate removed and the pins retracted.

DETAILED DESCRIPTION

The body 1 of the disconnect is hollow so as to form a wider upper chamber 2 and a narrower lower chamber 3. The top 4 of the body 1 is rounded to form a bearing surface for a webbing 6. As shown in FIGS. 1 and 2, the wider portion of the body 1 fits substantially the width of the webbing 6 so that an elastic band 7 can tightly hold the webbing on the body 1, therefore, the entire unit can be easily assembled in existing webbing without alterations.

Through the opposite side walls 8 of the higher chamber 2 extend retractable pins 9. Each pin 9 is slidable through a hole 11. The inner end of each retractable pin 9 is pivoted by a connector pin 12 in an elongated slot in the apex 13 of a bell crank 14. The perpendicular arm 16 of each bell crank 14 is pivoted on an axis pin 17 which forms the fulcrum for the movement of the respective bell crank 14. A lateral bell crank arm 18 extends toward the opposite side wall 8 of the chamber 2 and is connected by another connector pin 19 to an actuating yoke 21. Each arm 18 has an elongated slot 20 therein to compensate for the relative movement of the arm 18 on the pin 19.

The actuating yoke 21 is in the form of parallel plates 22 spaced apart to accommodate therebetween the lateral arms 18 of the respective bell cranks. From the hub 23 of the yoke 21 extends a stem 24. In the bottom of the lower or narrower chamber 3 is a hollow sleeve 26 and the stem 24 slidably projects into the same for limited axial movement. A coil spring 27 around the stem 24 bears at one end against the bottom of the lower chamber 3 and at its upper end against the yoke hub 23 normally to urge the yoke 21 upward thereby to urge the connector pins 12 upward and the retractable pins 9 outward. A casing 28 extends axially from the lower end of the body 1 and holds a flexible cable housing 29 for a cable 31. The cable 31 extends through the center of the stem 24. The inner end of the cable 31 is suitably secured to the shaft 24 so that when the cable 31 is pulled it pulls the yoke 21 from the position shown in FIG. 4 into the position shown in FIG. 6 pulling the connector pins 12 and thereby pulling the retractable pins 9 into the respective holes 8 for disconnecting the body 1.

A cover plate 33 as shown in FIG. 5 covers the open side of the chambers 2 and 3 and is secured in place by suitable screws as shown on the right hand side of FIG. 4. Each axis pin 17 is held in a suitable socket 34 in the back wall 36 of the chamber 2 and in another socket 35 in the inside of the cover plate 33. The thickness of the yoke is such that it slidably fits between the back wall 36 and the cover plate 33.

To further resist accidental actuation of the yoke 21, a shear pin 37 extends through the yoke hub 23 into suitable sockets in the back wall 36 and in the cover plate 33 and is made of such limited strength as to resist accidental shearing but to permit shearing by light manual operation. In the herein illustration the cable 31 is connected to a suitable handle 38.

As illustrated in FIGS. 1 and 2 the retractable pin disconnect is inserted in place of the usual webbing pin between the opposite legs 41 of a male connector member 42, which latter in turn is connected to a female connector member 43 in any well known manner. Sockets 44 in the opposite legs 41 are in alignment with the retractable pins 9 as shown in FIG. 1 for positive yet releasable engagement. Thus, an auxiliary release is provided without any interference with the male and female connectors or the usual releasable mechanism for the male and female connector members.

In operation the cable 31 is pulled so as to compress the coil spring 27 and simultaneously shear the shear pin 37 and pull the actuating yoke 21 toward and into the lower narrower chamber 3 thereby to rock the bell cranks around the axis pins 17 inwardly to pull the retractable pins 9 out of the connector sockets 44 and into the holes 11 thereby to release the webbing 6 without disturbing the connection between the usual male and female connector member. The device is simple, light, sufficiently small in size to be concealed in the webbing; yet is capable of holding sufficient load for the safety of a person in a parachute harness. The chamber 2 and 3 are completely covered and closed and the moving parts will not be affected by salt spray, sand, dust or fungus and therefore, all the pivots and pivotal connections and parts will be preserved in good operating condition. This device can be installed and held in the webbing of a parachute harness without stitching as illustrated in FIG. 1.

I claim:

1. In a retractable pin disconnect
a hollow casing
one end of said hollow casing being adapted to accommodate a webbing thereover so as to confine the casing in folded portions of said webbing,
opposite retractable pins slidably extended through opposite side walls of said hollow casing,
a pair of bell cranks within said hollow casing, means to connect each pin to the apex of the adjacent bell crank, each bell crank being pivoted at its lower arm in the casing, a lateral arm on each bell crank, an actuating member, means to connect the inner ends of the lateral arm of each bell crank to said actuating member, resilient means to urge said actuating member toward said one end of said casing thereby to push said retractable pins out through said side walls into interlocking positions, an element connected to said actuating member and extended through the other end of said casing and being manipulatable for pulling said actuating member against the action of said resilient means for retracting said pins from said interlocking positions.

2. The retractable pin disconnect specified in claim 1 and said actuating member being a yoke and said inner ends of said bell cranks being held in said yoke.

3. The retractable pin connector specified in claim 1, and said bell cranks, said actuating means and said resilient means being confined and fully covered in said hollow casing.

4. The invention specified in claim 2, and said yoke including a hub and a pair of parallel plates, the plates containing said lateral arms of said bell cranks therebetween, said means to connect said lateral arms of said bell cranks including pins operatively connecting the inner end of each arm to said parallel plates.

5. The retractable pin connector specified in claim 2, and a stem extending from said yoke and being slidable in said casing, said resilient means being a coil spring around said stem normally urging said yoke toward said one end of said casing.

6. The retractable pin connector specified in claim 1, and a removable cover sealing said hollow casing and covering said bell cranks, said actuating member and said resilient means.

7. The retractable pin connector specified in claim 1, and said hollow casing having a back wall, an opposite front wall, and an opening in said front wall for access into said hollow casing 1, a cover plate covering and sealing said opening, a pivot pin in the lower arm of each bell crank, said back wall and said cover plate having opposite bearing sockets for the ends of said pivot pin.

* * * * *